Nov. 19, 1957 R. W. HAMAN ET AL 2,813,494
RAILWAY PASSENGER CAR
Filed March 14, 1952 7 Sheets-Sheet 1

Inventors
Ralph W. Haman
James E. Candlin Jr.
& Clarence V. Norby
By Wayne Morris Russell
Attorney

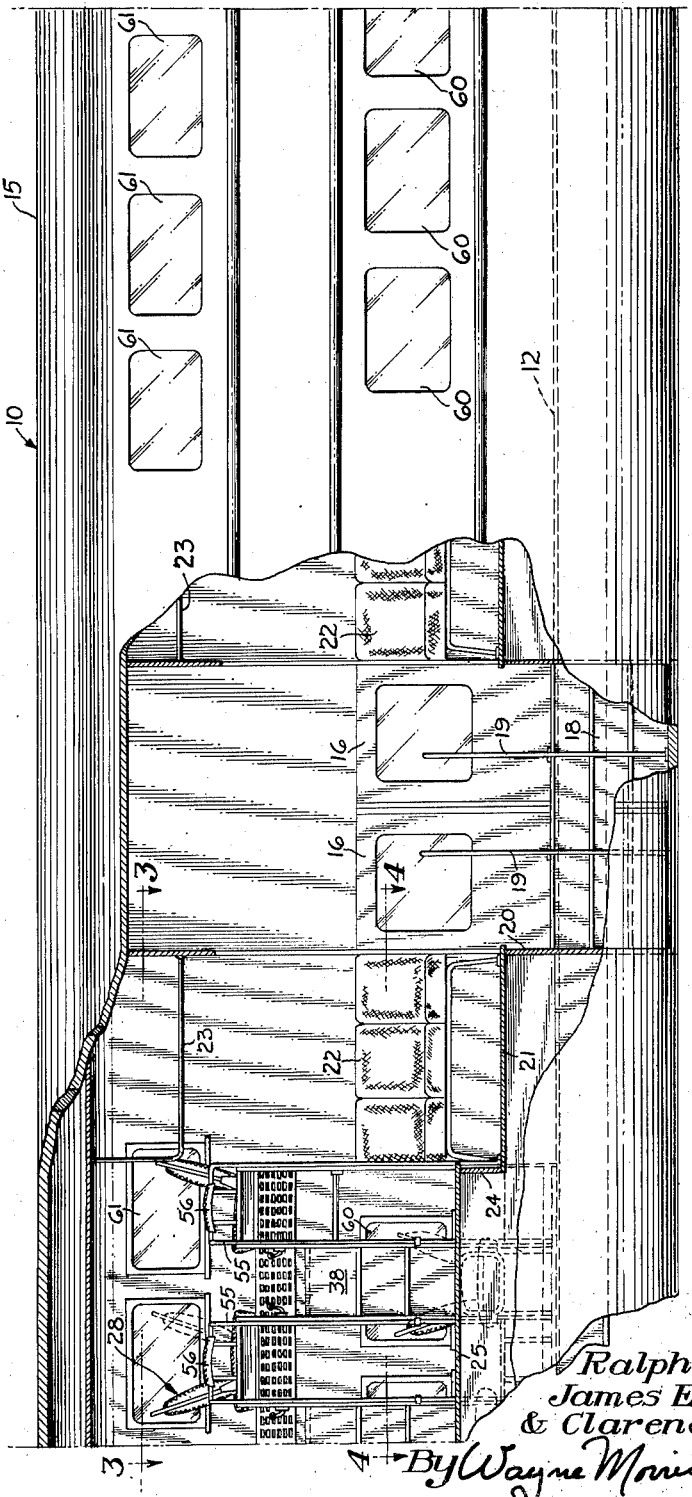

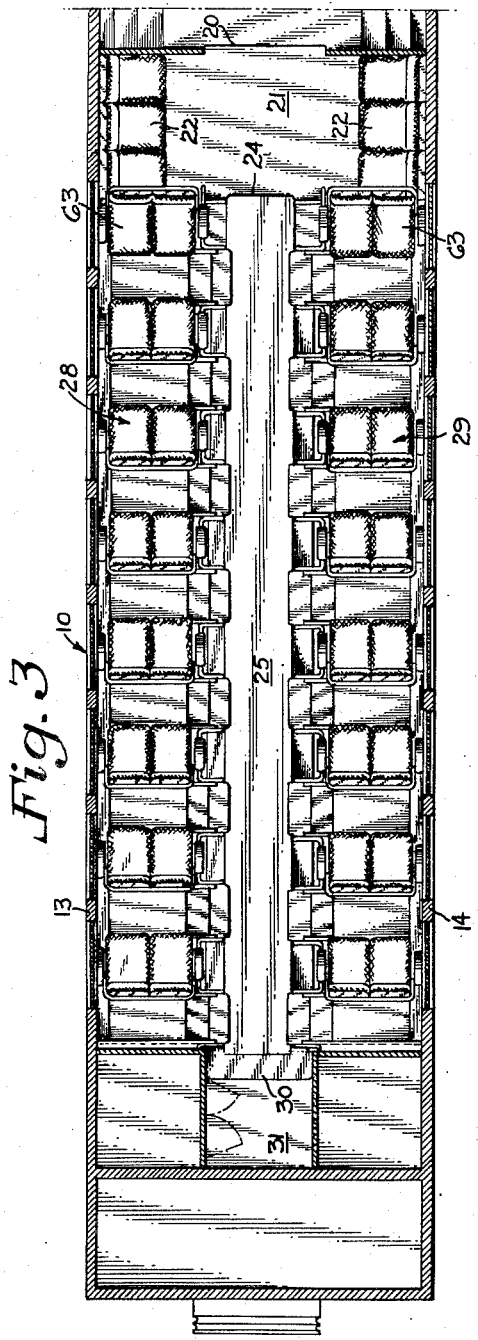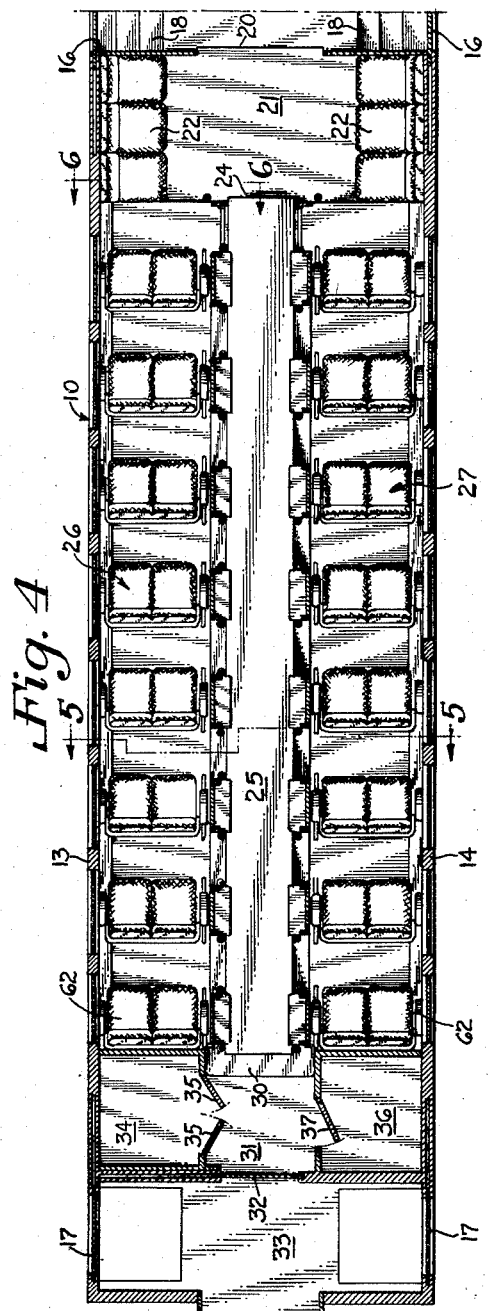

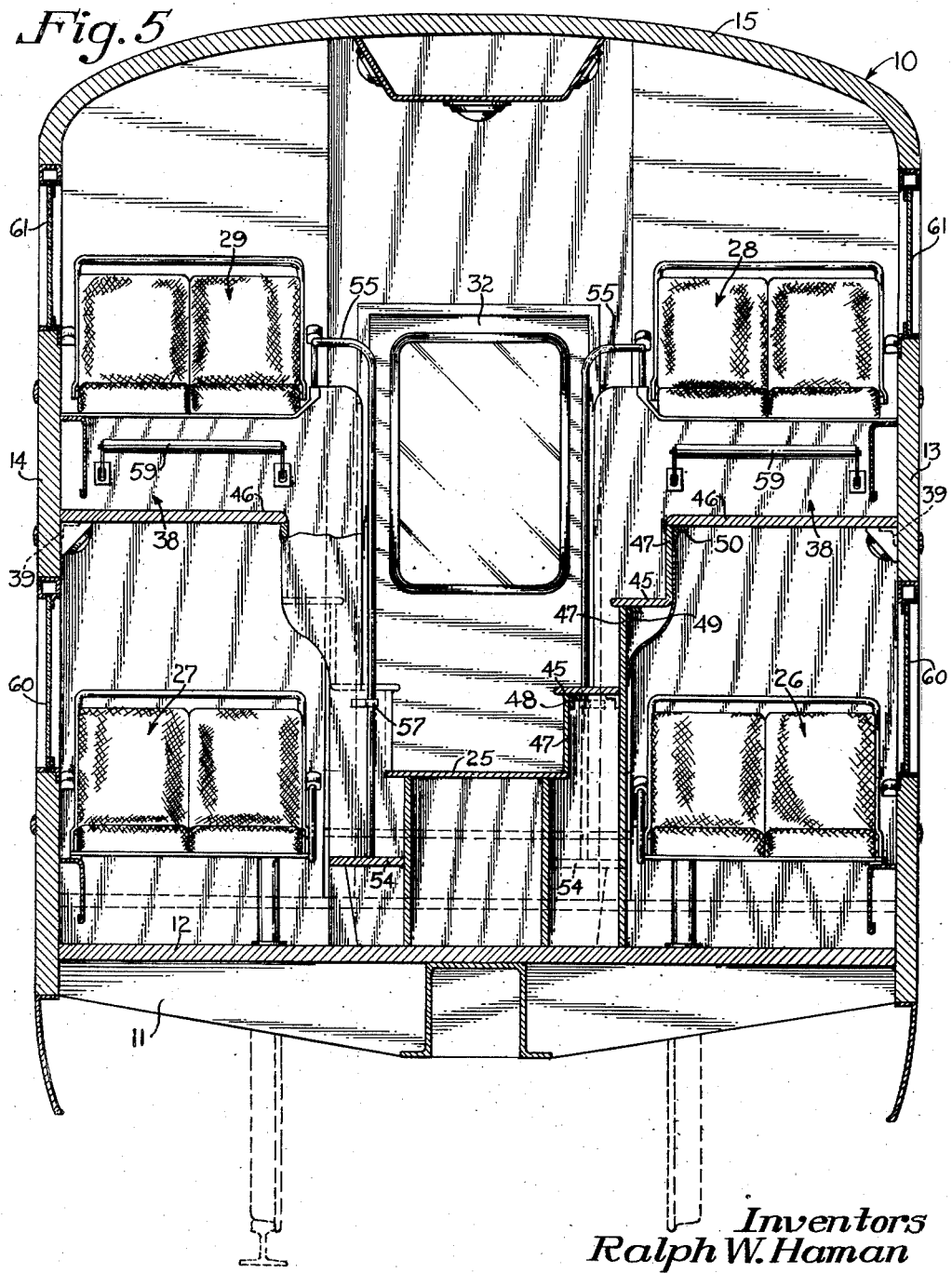

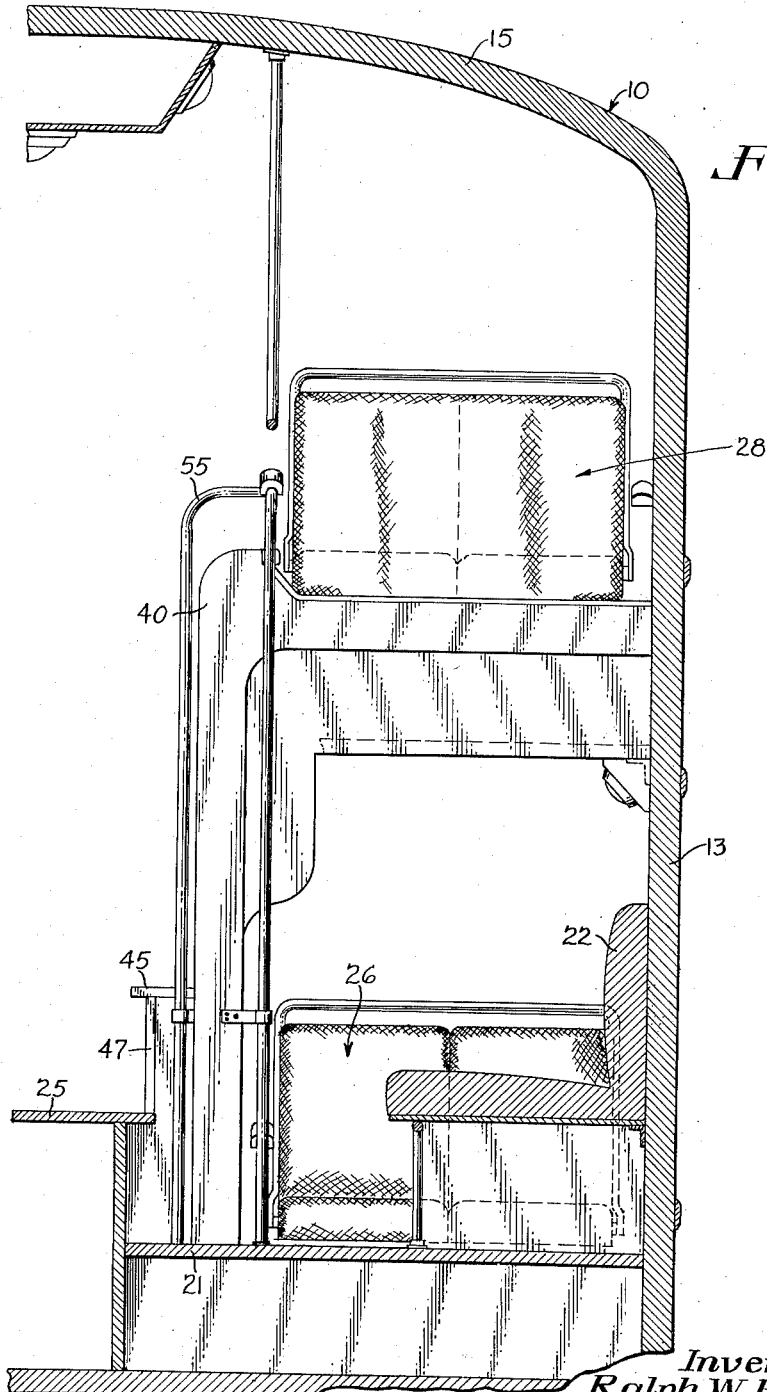

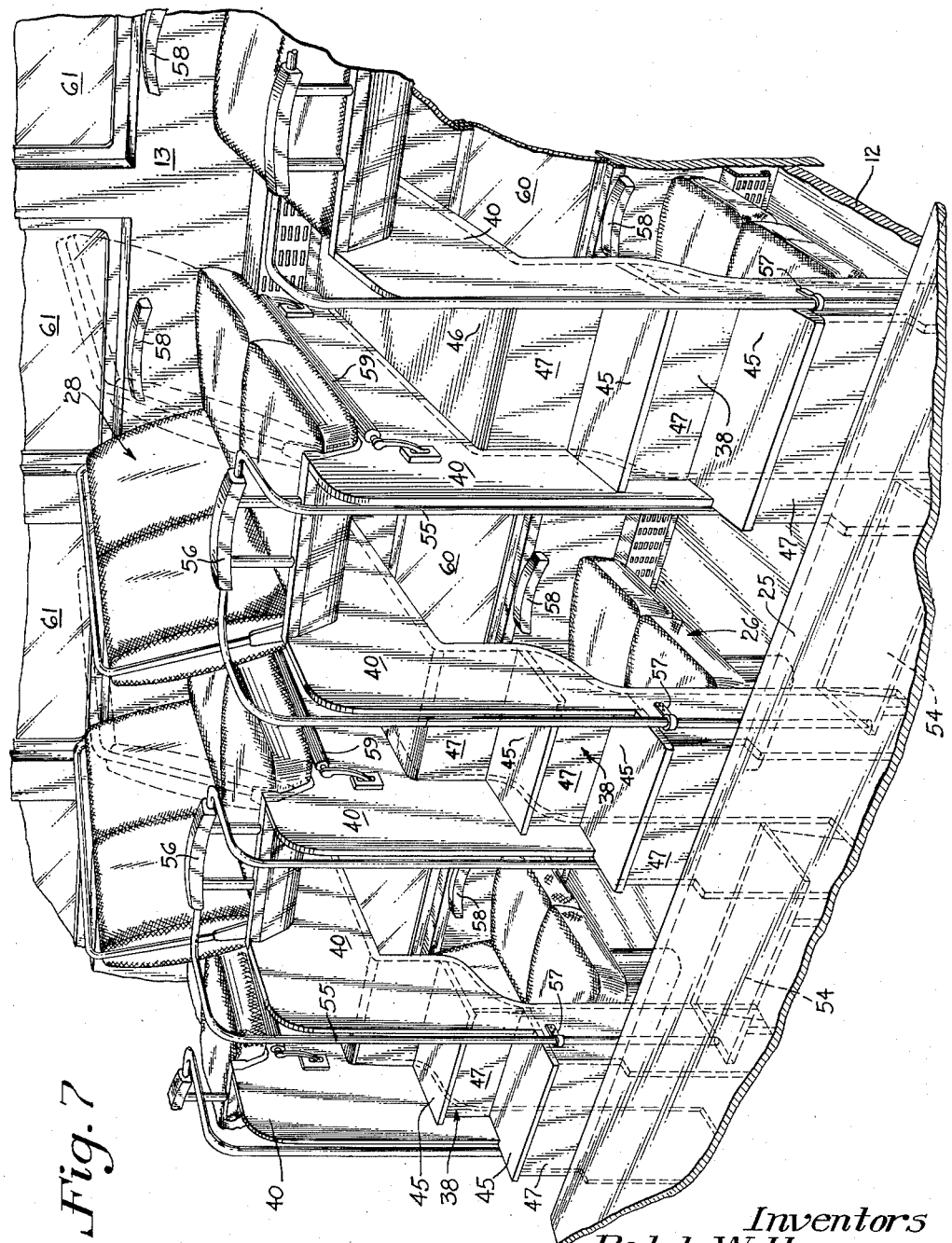

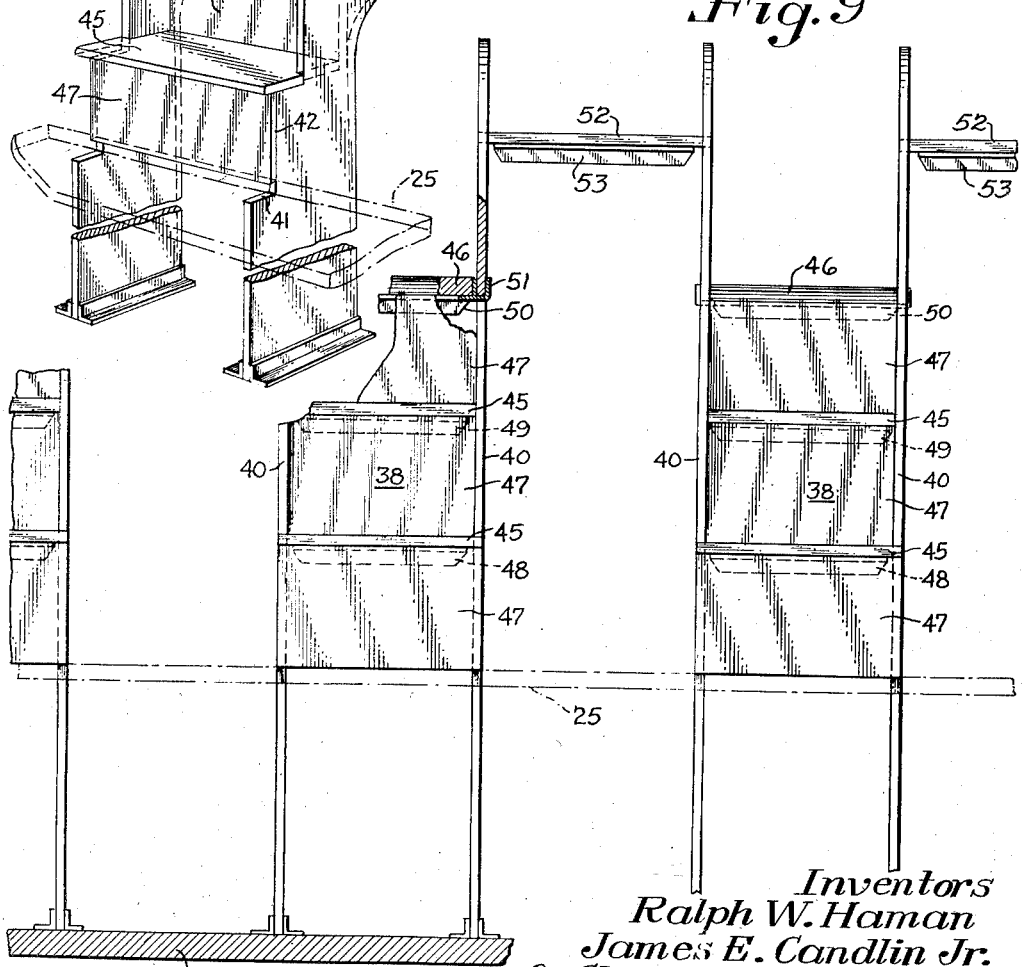

United States Patent Office 2,813,494
Patented Nov. 19, 1957

2,813,494

RAILWAY PASSENGER CAR

Ralph W. Haman, Flossmoor, Ill., James E. Candlin, Jr., Hammond, Ind., and Clarence V. Norby, Chicago, Ill., assignors to Pullman-Standard Car Manufacturing Company, Chicago, Ill., a corporation of Delaware Application March 14, 1952, Serial No. 276,568

6 Claims. (Cl. 105—340)

This invention relates to passenger vehicles and is primarily concerned with a railway passenger car having reversible seats at two different levels.

The principal object of the invention is to provide reversible seats on two different levels in a passenger vehicle.

A more specific object of the invention is to provide in a passenger vehicle two parallel rows of seats on one level, two parallel rows of seats spaced above the first named two rows of seats and in parallel relation therewith, the seats in all of the rows being reversible, and a passageway between the rows of seats from which the seats in all of the rows are accessible.

An important object of the invention is to provide in a passenger vehicle having seats at two different levels, a stair assembly leading to the seats on the uppermost level and adapted to be fabricated as a subassembly and secured to the vehicle comprising spaced walls, and spaced members extending between the walls.

Another object is to provide in a passenger vehicle having seats at two different levels, a stair assembly leading to the seats on the uppermost level and adapted to be fabricated as a subassembly and secured to the vehicle comprising spaced vertically disposed walls, a member extending between the walls, and a member spaced from the first named member and having a greater width than the first named member and extending between the walls and spaced below the top edges of the walls.

Another object of the invention is to provide in a passenger vehicle having seats at two different levels, a stair assembly leading to the seats on the uppermost level and adapted to be fabricated as a subassembly and secured to the vehicle comprising spaced vertically disposed generally L-shaped walls, a member extending between one of the adjacent pairs of arms of the L-shaped walls, and a member spaced from the first named member and having a greater width than the first named member and extending between the bottom edges of the other adjacent pair of arms of the L-shaped walls.

A further object of the invention is to provide in a passenger vehicle having a floor and a side wall, a row of spaced seats extending longitudinally of the vehicle and secured to the floor, a plurality of stair assemblies arranged in side by side spaced relation with each other extending transversely of the vehicle and each stair assembly overlying the adjacent one of the seats and secured to the floor and side wall, and seats bridging adjacent pairs of stair assemblies.

A further object of the invention is to provide in a passenger vehicle having a floor and a side wall, a row of spaced seats extending longitudinally of the vehicle and secured to the floor, a plurality of stair assemblies arranged in side by side spaced relation with each other extending transversely of the vehicle and each stair assembly overlying the adjacent one of the seats and secured to the floor and the side wall, seats bridging adjacent pairs of stair assemblies, an element forming the bottom of a passageway extending longitudinally of the vehicle and spaced above the floor and positioned against the stair assemblies, and a step positioned between the floor and the element and extending between adjacent pairs of stair assemblies.

The foregoing and other objects of the invention are attained by the construction and arrangement illustrated in the accompanying drawings wherein:

Fig. 2 is a side elevational view of the central portion of the suburban railway passenger car, the side wall of the car being broken away to expose the interior of the car;

Fig. 3 is a plan sectional view through a portion of the car taken on the line 3—3 in Figs. 1 and 2;

Fig. 4 is a plan sectional view through a portion of the car taken on the line 4—4 in Figs. 1 and 2;

Fig. 5 is a cross sectional view through the car taken on the line 5—5 of Fig. 4;

Fig. 6 is a cross sectional view taken on the line 6—6 of Fig. 4;

Fig. 7 is a fragmentary perspective view of the interior of the car showing the upper and lower level seats, the stair assembly leading to the upper level seats, the steps leading to the lower level seats, and the passageway from which both the upper and lower level seats are accessible;

Fig. 8 is a detail perspective view of the stair assembly leading to the upper level seats; and Fig. 9 is an elevational view showing a plurality of the stair assemblies arranged in side by side spaced relation with horizontal extensions connecting them together.

Figure 1:
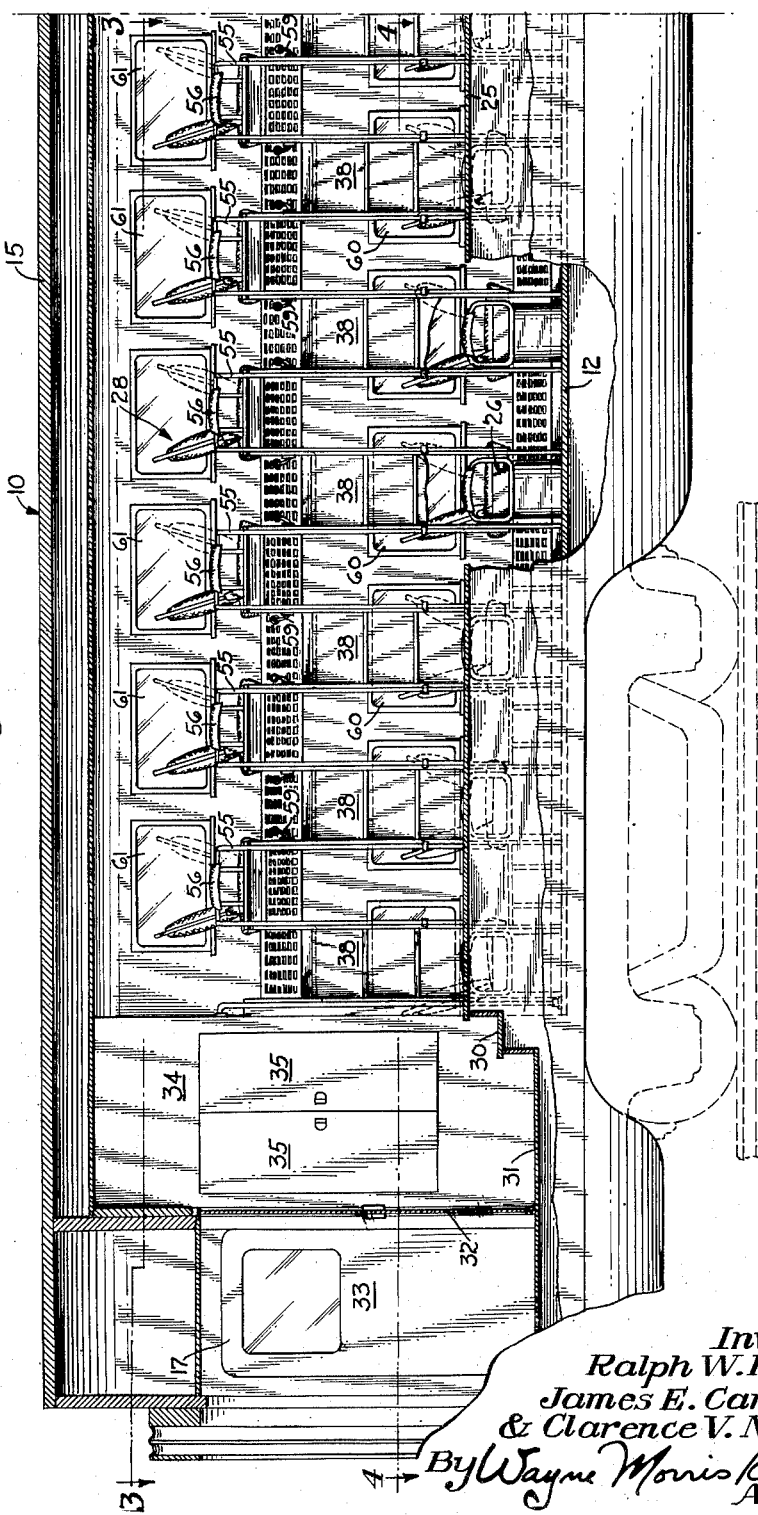
Fig. 1 is a longitudinal vertical section through a portion of a suburban railway passenger car.

The invention proposes reversible seats on two different levels in a passenger vehicle. Two rows of seats are arranged in spaced relation with each other and extend longitudinally of the vehicle and are supported on the floor of the vehicle. Two more rows of seats are arranged in spaced relation with each other and extend longitudinally of the vehicle and are spaced above the first named rows of seats. An element is positioned in the space between the first named rows of seats and extends longitudinally of the vehicle and is spaced above the floor of the vehicle. This element forms a passageway between the four rows of seats and from which all four rows of seats are accessible. Means are provided to enable passengers who desire upper level seats to reach them in the form of stair assemblies. Each stair assembly is adapted to be fabricated as a subassembly and then secured to the inside of the vehicle. A plurality of stair assemblies are arranged in side by side space relation with each other in the vehicle and extend transversely of the vehicle from one side of the element forming the passageway to one side wall of the vehicle and lead to one of the rows of seats on the upper level.

Each stair assembly is positioned against said one side of the element forming the passageway and rests on the floor of the vehicle and is secured thereto and each stair assembly overlies the adjacent one of the seats in one row on the lower level and also rests against said one side wall of the vehicle and is secured thereto. A step is positioned between the floor of the vehicle and the element and extends between adjacent pairs of stair assemblies to assist passengers in reaching one of the seats in said one row on the lower level. An identical number of stair assemblies extend between the other side of the element forming the bottom of the passageway and the other side wall of the vehicle and these stair assemblies overlie the other row of seats on the lower level and lead to the other row of seats on the upper level. An identical step is provided for passengers desiring one of the seats in said other row on the lower level. Each upper level seat is bridged across adjacent pairs of stair assemblies and is supported by these stair assemblies.

In the drawings, 10 generally designates a passenger vehicle or suburban railway passenger car having an underframe 11, floor 12, side walls 13 and 14 and a roof 15. The car is provided with sliding doors 16 in the side walls 13 and 14 located at the center of the car and is provided with sliding doors 17 in the side walls at each end of the car.

Assuming prospective passengers enter at the center doors and exit at the end doors, upon entering the car at one of the center doors the prospective passenger first ascends steps 18 using hand rails 19 to reach the floor 12 at one level. Then the prospective passenger ascends a step 20 to a floor 21 at a slightly higher level. On this floor 21 are seats 22 arranged in threes which face toward the center of the car and the prospective passenger may take one of these seats or elect to stand and grasp one of the standee handholds 23. In the usual case however the prospective passenger will not elect the passenger accommodations just mentioned but will elect to ascend the step 24 onto a floor 25 at a still higher level. At this stage the prospective passenger may elect to take one of the seats in the rows 26 and 27 on a level lower than the floor 25 or one of the seats in the rows 28 and 29 on a level higher than the floor 25. Upon reaching his destination the passenger may descend steps 30 adjacent one end of the car to a floor 31 at a lower level and then pass through a sliding door 32 extending transversely of the car to the vestibule 33 and then the passenger steps down to one of the sliding doors 17 to alight from the car. Part of the area in the region of the floor 31 at one end of the car is provided with a locker 34 having swinging doors 35 and situated opposite the locker is a general toilet 36 having a door 37.

The rows of seats 26 and 27 are arranged in horizontally spaced parallel relation with respect to each other and extend longitudinally of the car and are supported by the floor 12 of the car and by the adjacent side wall of the car. The rows of seats 28 and 29 are arranged in horizontally spaced parallel relation with respect to each other and extend longitudinally of the car and are in generally parallel relation with and spaced above the rows of seats 26 and 27 respectively as best shown in Fig. 5. The floor or element 25 forms the bottom of a passageway which extends longitudinally of the vehicle and the floor or element 25 is spaced above the floor 12.

A plurality of stair assemblies 38 leading to the seats in the row 28 on the upper level are fabricated of metal and are arranged in side by side spaced relation with respect to each other and extend transversely of the vehicle from one side of the element 25 to the side wall 13 as best shown in Fig. 7. Each stair assembly 38 rests upon the floor 12 and is secured thereto and is positioned against the element 25 and each stair assembly is welded to an angle 39 which is welded to the side wall 13. Each stair assembly 38 overlies the adjacent one of the seats in the row 26. That is, each of the seats in the row 26 is disposed below and positioned longitudinally centrally of the adjacent one of the stair assemblies 38. An identical number of stair assemblies 38 extend between the other side of the element 25 and the side wall 14 of the car and the general arrangement of the stair assemblies with respect to the rows of seats 27 and 29 is the same as the arrangement of the stair assemblies with respect to the rows of seats 26 and 28.

Each stair assembly 38 is adapted to be fabricated as a subassembly and comprises a pair of vertically disposed generally L-shaped walls 40 arranged in side by side spaced relation with respect to each other as best shown in Fig. 8. Each of the walls 40 is made up of two arms integral with each other and the two arms together give the wall its L-shaped. The walls 40 are cut away inwardly and upwardly in stair-step form as at 41 and 42 and the top edges of the walls 40 are cut away as at 43 leaving projections 44. A pair of members or step treads 45 extend between one of the adjacent pairs of arms on the walls 40. A member or step tread 46 is arranged in spaced relation with respect to the members 45 and has a greater width than the members 45 and extends between the bottom edges of the other adjacent pair of arms on the walls 40. The member 46 forms a foot support for a passenger sitting in one of the seats on the upper level. Three vertically disposed webs 47 support the members 45 and the member 46. An angle 48 is welded to the lowermost member 45 and the lowermost web 47 and an angle 49 is welded to the uppermost member 45 and the middle web 47 and an angle 50 is welded to the uppermost web 47 and the member 46 and an extrusion 51 is welded to each of the walls 40 and the member 46.

A horizontal extension 52 extends between adjacent pairs of stair assemblies and is welded thereto and is disposed against the car side wall and an angle 53 is disposed against the car side wall and is welded to the extension 52 and to the side wall of the car, all as best shown in Fig. 9. The upper level seats are supported upon the extensions 52 and bridge across adjacent pairs of stair assemblies 38. The extension 52 may be made of two parts with one of the parts extending from one stair assembly and the other part extending from the other stair assembly and these two parts have their adjacent ends in abutting relation and secured together and the two parts together form a support for a pair of the upper level seats. A step 54 is positioned between the floor 12 and the element 25 and extends between adjacent pairs of stair assemblies 38 and its purpose is to assist passengers in reaching lower level seats. The element 25 rests upon the cut out portions of oppositely disposed stair assemblies 38. A vertically disposed U-shaped rail 55 is positioned between adjacent pairs of stair assemblies 38 and the free ends of the legs of the rail are positioned on the adjacent one of the steps 54 and the legs of the rail are bent adjacent their upper ends and the bight of the rail forms an armrest 56 for the adjacent one of the upper level seats as best shown in Figs. 7. One leg of the rail 55 is secured to the vertical wall 40 of one stair assembly by clamps 57 and the other leg of the rail is secured to the vertical wall of the adjacent stair assembly by clamps 57. The upper and lower level seats have armrests 58 secured to the side wall of the car, and footrests 59 are pivotally mounted on the vertical walls 40 for the convenience of passengers in the upper level seats. The lower level seats have windows 60 opposite them in the side walls of the car and the upper level seats have windows 61 opposite them. The seats 62 on the lower level at each end of the car are fixed in one position and cannot be moved. The seats 63 on the upper level adjacent the center doors are fixed in one position and cannot be moved. All of the remaining seats in the rows 26, 27, 28 and 29 are reversible, that is, the seat backs can be moved so that the seats can be made to face toward one end of the car or the seat backs can be moved so that the seats will face toward the other end of the car as is clearly shown in Fig. 1 or the seat backs may be so disposed that the seats will be in confronting relation with respect to each other.

It is to be emphasized that each of the stair assemblies 38 might be formed by pressing from a single piece, that is, each of the stair assemblies could be made as an integral structure.

From the foregoing it will be seen that there has been provided, a passenger vehicle having reversible seats at two different levels, a stair assembly leading to the upper level seats which is adapted to be fabricated as a subassembly and then installed in the vehicle, and the novel general arrangement of the upper level seats and the stair assembly leading to the upper level seats and the lower level seats and the steps leading to the lower level seats which greatly increases the usefulness of the vehicle.

What is claimed is:

1. In a passenger coach vehicle having seats supported at one level and seats supported at a second level above said one level, a pair of stair assemblies positioned in side by said spaced relation with each other and secured to the vehicle and each stair assembly leading to the second named seats, an extension extending between the pair of stair assemblies and adapted to form a support for one of said second named seats, each of the stair assemblies comprising spaced walls and spaced step treads extending between the walls.

2. In a passenger vehicle having a floor and a side wall, a first row of spaced seats extending longitudinally of the vehicle and secured to said floor, a second row of spaced seats extending longitudinally of the vehicle and spaced above said first row of seats, and a plurality of stair assemblies leading to said second row of seats arranged in side by side spaced relation with respect to each other extending transversely of the vehicle and each stair assembly being secured to said floor and said side wall, each of the first named seats being disposed below and longitudinally centrally of the adjacent one of the stair assemblies.

3. In a passenger vehicle having a floor and a side wall, a row of spaced seats extending longitudinally of the vehicle and secured to said floor, a plurality of stair assemblies arranged in side by side spaced relation with respect to each other extending transversely of the vehicle and each stair assembly overlying the adjacent one of said seats and secured to said floor and said side wall, and seats bridging adjacent pairs of stair assemblies.

4. In a passenger vehicle having a floor and a side wall, a row of spaced seats extending longitudinally of the vehicle and secured to said floor, a plurality of stair assemblies arranged in side by side spaced relation with respect to each other extending transversely of the vehicle and each stair assembly overlying the adjacent one of said seats and secured to said floor and said side wall, seats bridging adjacent pairs of stair assemblies, and an element forming the bottom of a passageway extending longitudinally of the vehicle and spaced above said floor and positioned against said stair assemblies.

5. In a passenger vehicle having a floor and a side wall, a row of spaced seats extending longitudinally of the vehicle and secured to said floor, a plurality of stair assemblies arranged in side by side relation with respect to each other extending transversely of the vehicle and each stair assembly overlying the adjacent one of said seats and secured to said floor and said side wall, seats bridging adjacent pairs of stair assemblies, an element forming the bottom of a passageway extending longitudinally of the vehicle and spaced above said floor and positioned against said stair assemblies, and a step positioned between said floor and said element and extending between adjacent pairs of stair assemblies.

6. In a passenger vehicle having a floor and a side wall, a row of spaced seats extending longitudinally of the vehicle and secured to said floor, a plurality of stair assemblies arranged in side by side spaced relation with respect to each other extending transversely of the vehicle and each stair assembly overlying the adjacent one of said seats and secured to said floor and said side wall, seats bridging adjacent pairs of stair assemblies, an element forming the bottom of a passageway extending longitudinally of the vehicle and spaced above said floor and positioned against said stair assemblies, a step positioned between said floor and said element and extending between adjacent pairs of stair assemblies, a vertically disposed U-shaped rail positioned between adjacent pairs of stair assemblies and the bight of said rail forming an armrest for the adjacent one of the last named seats, and means securing said rail to the adjacent pairs of stair assemblies.

References Cited in the file of this patent

UNITED STATES PATENTS

| | | |
|---|---|---|
| 747,489 | Rounds | Dec. 22, 1903 |
| 927,707 | Breda | July 13, 1909 |
| 1,178,275 | Smith | Apr. 4, 1916 |
| 1,197,074 | Steffens | Sept. 5, 1916 |
| 1,769,027 | Hutt | July 1, 1930 |
| 2,285,933 | Ledwinka et al. | June 9, 1942 |
| 2,405,136 | Dittrich | Aug. 6, 1946 |
| 2,522,674 | Heyerdahl | Sept. 19, 1950 |
| 2,548,292 | Eksergian | Apr. 10, 1951 |
| 2,564,909 | Kuhler et al. | Aug. 21, 1951 |
| 2,589,997 | Dean et al. | Mar. 18, 1952 |